United States Patent [19]  [11]  4,424,286
Nakagawa et al.  [45]  Jan. 3, 1984

[54] EXPANDED SHAPED ARTICLE COMPRISING A HEAT RESISTANT SYNTHETIC RESIN

[75] Inventors: Masao Nakagawa, Takasago; Tatehiko Nishida, Himeji, both of Japan

[73] Assignee: Kanegafuchi Kagaku Kogyo Kabushiki Kaisha, Osaka, Japan

[21] Appl. No.: 412,597

[22] Filed: Aug. 30, 1982

Related U.S. Application Data

[63] Continuation of Ser. No. 219,344, Dec. 22, 1980, abandoned.

[51] Int. Cl.³ ............................ C08J 9/18; C08J 9/20
[52] U.S. Cl. ...................................... 521/58; 264/53; 264/DIG. 9; 521/56; 521/59; 521/60; 521/139
[58] Field of Search ..................... 521/56, 58, 59, 60, 521/139

[56]  References Cited

U.S. PATENT DOCUMENTS 3,058,928 10/1962 Eichhorn et al. ..................... 521/58
3,058,929 10/1962 Vanderhoff et al. ................. 521/58
3,461,088 8/1969 Stahnecker et al. ................. 521/58
4,032,481 6/1977 Pillar .................................... 521/58
4,277,567 7/1981 Keyworth et al. ................... 521/56

Primary Examiner—Morton Foelak
Attorney, Agent, or Firm—Moonray Kojima

[57]  ABSTRACT

An expanded shaped article of a heat resistant synthetic resin comprising 20 to 100 weight percent tertiary butyl styrene and 80 to 0 weight percent other monomers polymerizable therewith, and containing volatile foaming agent, wherein expandable particles of said resin are pre-expanded by application of heat and then molded by application of heat to produce shaped articles. Extrusion foaming may be used to form the article.

9 Claims, 2 Drawing Figures

EXPANDED SHAPED ARTICLE COMPRISING A HEAT RESISTANT SYNTHETIC RESIN

This is a continuation, of application Ser. No. 219,344, filed 12/22/80, now abandoned.

BACKGROUND OF THE INVENTION

This invention relates to expanded shaped articles and more particularly to such articles comprising heat resistant synthetic resin.

In the prior art, the most frequently used resin for expanded shaped articles is polystyrene. Styrene polymer particles containing a volatile foaming agent are pre-expanded with use of heated steam, for example. Then, the pre-expanded particles are heated in a closed mold having openings for escape of foaming agent, to bond together the particles and thereby produce the expanded shaped article. Extrusion foaming may also be used.

These prior art polystyrene articles have a marked deficiency which limits their usage, namely, they do not have good heat resistance property. Thus, their use as a thermal insulator, for example, for pipes carrying elevated temperature material, is limited. Accordingly, there exists in the art, an urgent need for expandable synthetic resin shaped articles which are heat resistant.

SUMMARY OF THE INVENTION

An object of the invention is to overcome the aforementioned and other deficiencies and disadvantages of the prior art.

A further object is to produce an expandable polymer composition which is substantially heat resistant.

Another object is to produce an expanded shaped article comprising a heat resistant synthetic resin.

The foregoing and other objects of the invention are attained in this invention which encompasses expandable synthetic resin composition comprising preferably 20 to 100 weight percent, more preferably 25 to 75 weight percent, tertiary butyl styrene, and preferably 80 to 0 weight percent, more preferably 75 to 25 weight percent, other monomers polymerizable therewith, and containing 3 to 15 weight percent volatile foaming agent. (The parts and percents used herein are in terms of weight unless indicated to the contrary). The composition is pre-expanded using heat, such as steam, with a pressure of 0.1 kg/cm$^2$G or more. The pre-expanded particles are placed in a closed mold having openings for escape of the volatile foaming agent, and then heated using steam or steam mixed with air, and at a pressure of 1.0 kg/cm$^2$G or more. The particles are thus bonded together and expanded and shaped to form the desired shaped article, which has substantially all of the advantages of polystyrene and in addition has the advantageous property of heat resistance.

A feature of the invention is a heat resistant expandable polymer or copolymer composition of preferably 20 to 100 weight percent, more preferably 25 to 75 weight percent, tertiary butyl styrene; and preferably 80 to 0 weight percent, or more preferably 75 to 25 weight percent, other monomers polymerizable therewith.

A further feature is the use in the polymer of copolymer composition of 3 to 15 weight percent volatile foaming agent.

Another feature is the copolymerization of tertiary butyl styrene with the other monomers by polymerizing the tertiary butyl styrene as the initial monomer and then adding the other monomer at a conversion rate of the initial monomer of between 15 to 75 percent.

A further feature is the polymerization of the other monomer as the initial monomer and then adding the tertiary butyl styrene at a conversion rate of the initial monomer of between 15 and 75 percent.

Another feature is a heat resistant expandable polymer composition wherein 20 to 100 weight percent tertiary butyl styrene is copolymerized with 80 to 0 weight percent monomer selected from the group consisting of styrene, acrylonitrile, alpha methyl styrene, methyl methacrylate, n-butyl acrylate, ethyl acrylate, and 2-ethylhexyl acrylate; and using 3 to 15 weight percent volatile foaming agent selected from the group consisting of n-butane, iso-butane, n-pentane, iso-pentane, petroleum ether, dichlordifluromethane and mixtures thereof.

A further feature is the pre-expansion of the heat resistant polymer composition using steam at a pressure of 0.1 kg/cm$^2$G or more.

Another feature is the molding of the pre-expanded polymer particles using steam or a mixture of steam and air at a pressure of 1.0 kg/cm$^2$G or more, thereby to expand the particles and bond same to each other and form the shaped article.

DETAILED DESCRIPTION OF PREFERRED EMBODIMENTS

Figure 1A:
FIG. 1A depicts a side view of the cavity of the mold used to test the product of the invention.

The heat resistant properties of expanded shaped articles are substantially improved by heating expandable polymer particles having a monomeric composition comprising 20 to 100 weight percent tertiary butyl styrene and 80 to 0 weight percent other monomers polymerizable therewith, and containing a volatile foaming agent, thereby to pre-expand the particles, and thereafter heating the pre-expanded particles by use of a heating medium, such as superheated steam, in a closed mold provided with holes for permitting the escape of gas from the foaming agent; or by extrusion foaming a polymer comprising a monomeric composition comprising 20 to 100 weight percent tertiary butyl styrene and 80 to 0 weight percent other monomers polymerizable therewith.

The monomeric composition used in the invention comprises preferably 20 to 100 weight percent tertiary butyl styrene, and 80 to 0 weight percent other monomers polymerizable therewith; or more preferably 25 to 75 weight percent tertiary butyl styrene and 75 to 25 weight percent other monomers polymerizable therewith. In cases where the tertiary butyl styrene is less than 20 weight percent, sufficient practical improvement of heat resistance is not attained. In cases where the tertiary butyl styrene is more than 75 weight percent, the heat resistant properties are satisfactory, but the resultant expanded shaped articles are fragile. Thus, it is preferable to employ 75% or less tertiary butyl styrene when strength is particularly required.

The other monomers which are used in the present invention to polymerize with the tertiary butyl styrene are preferably vinyl monomers, such as styrene, acrylonitrile, alpha methyl styrene, methyl methacrylate, n- butyl acrylate, ethyl acrylate, 2-ethylhexyl acrylate and mixtures thereof.

Polymer particles comprising the aforementioned monomers and tertiary butyl styrene are produced preferably by suspension polymerization or emulsion polymerization. The tertiary butyl styrene and other monomers may be added together at the same time when materials are charged into a polymerization vessel. Another way is to first polymerize the tertiary butyl styrene as the initial monomer, and then adding the other monomers intermittently or at one time when the conversion rate of the initial monomer is between 15 to 75%, thereby to complete the polymerization. Another way is to use the other monomers as the initial monomer which is first polymerized, and then the tertiary butyl styrene may be added intermittently or at one time when the polymerization of the initial monomer is between 15 to 75% conversion, thereby to complete the polymerization.

In effecting pre-expansion or heat molding by use of a heating medium, it is necessary that the polymer particles contain a volatile foaming agent. The placement of the volatile foaming agent in the particles may be carried out during the course of suspension polymerization or after the termination of suspension polymerization. Further, the foaming agent may be applied to polymer pellets which are obtained by pelletizing a polymer prepared by emulsion polymerization.

The volatile foaming agent used in the present invention are preferably n-butane, iso-butane, n-pentane, iso-pentane, petroleum ether, dichlorodifluoromethane and mixtures of the foregoing.

Additives for enhancing the foaming action may be employed; for example, such additives as heptane, hexane, cyclohexane, dioctyladipate, dioctylphthalate, dibutylphthalate and the like.

As a polymer to be used for extrusion foaming, wherein a foaming agent is applied by pressure in an extruder, the aforementioned polymer particles containing foaming agent may be used, or polymer particles not containing any foaming agent may be used.

The pre-expansion of expandable polymer particles containing volatile foaming agent is preferably effected at a pressure of 0.1 kg/cm$^2$G (102° C.), or more, such as by using steam heat. In the prior art, expandable polystyrene particles were usually pre-expanded using steam pressure of 0 kg/cm$^2$G (100° C.). In case, less than 0.1 kg/cm$^2$G is used, the desired expansion rate is not obtained. Moreover, molding after pre-expansion is carried out using a heating medium, such as steam or steam and air, at a maximum pressure, at the time of molding of the interior of shaped articles, of preferably 1.0 kg/cm$^2$G or more. In case less than 1.0 kg/cm$^2$G pressure is used, satisfactory shaped articles are not obtained.

Figure 1B:
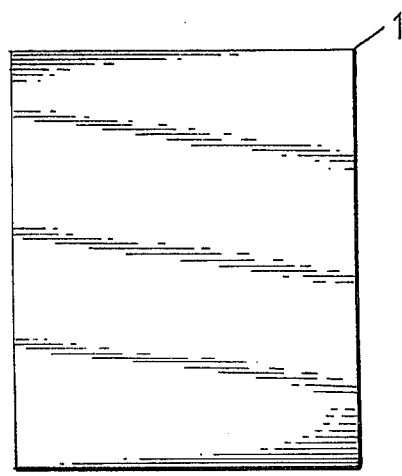
FIG. 1B depicts a plane view of the cavity of the mold of FIG. 1A.

Turning now to the drawing, FIGS. 1A and 1B depict the cavity of a metallic mold/used for test observations of expanded articles prepared in accordance with the invention. The cavity of the mold has three dimensions: 200 mm×300 mm×20 mm and is used with a molding machine sold under the Trade Mark "Pearl Star-90," manufactured by Toyo Machinery and Metal Co., Ltd. The articles prepared in the following examples were tested in the foregoing mold and machine.

The invention will now be further illustrated with actual examples, which examples are not to be construed as limiting the invention.

EXAMPLE 1

Into an autoclave provided with an agitator, were charged 110 parts of water, 0.15 part tricalcium phosphate, 0.006 part alpha olefine sodium sulfonate, and 0.3 part sodium chloride. Then, a monomeric mixture comprising 30 parts tertiary butyl styrene and 70 parts styrene in which 0.3 part benzoylperoxide, 0.1 part 1,1-(tertbutylperoxid)-3,3,5-trimethylcyclohexane and 0.7 part dioctyladipate were dissolved, was added with stirring, and then dispersed. The obtained mixture was immediately heated up to 90° C. and polymerized for 6 hours. After that, 10 parts butane and 1.8 parts cyclohexane were added as foaming agent to the mixture. Then, the mixture was elevated to 110° C. After being maintained at 110° C. for 8 hours, the autoclave was cooled to 40° C. Polymer particles A were obtained after dehydration, drying and sieving.

Polymer particles having diameters ranging from 710 to 1,000 microns were chosen and expanded at a steam pressure of 0 kg/cm$^2$, 0.1 kg/cm$^2$, 0.2 kg/cm$^2$ and 0.5 kg/cm$^2$, respectively. Then, the expansion rate of the particles was measured in a manner described below. The obtained results are shown in Table 1.

The expansion rate is indicated by apparent volume. The apparent volume was measured in a manner in which a certain volume of polymer particles was picked in a measuring cylinder and graduations (cc) of the measuring cylinder per 10 g of the polymer particles were observed.

EXAMPLE 2

Polymer particles B were prepared in a similar fashion to that of Example 1, except that a monomeric mixture comprising 50 parts of tertiary butyl styrene and 50 parts styrene, was employed. The expansion rate was measured similarly as in Example 1. Table 1 shows the results.

EXAMPLE 3

Polymer particles C were prepared in a manner similar to that of Example 1, except that the monomeric mixture comprised 50 parts styrene, 30 parts tertiary butyl styrene, and 20 parts acrylonitrile. Expansion rate was measured in a manner similar to that of Example 1. The results are shown in Table 1.

EXAMPLE 4

Polymer particles D were prepared in a manner similar to that of Example 1, except that the monomeric mixture comprised 30 parts tertiary butyl styrene, 60 parts styrene, and 10 parts alpha methyl styrene. Expansion rate was measured in a manner similar to that of Example 1. Table 1 gives the results.

EXAMPLE 5

Polymer particles E were prepared in a manner similar to that of Example 1, except that the monomeric mixture comprised 75 parts tertiary butyl styrene and 25 parts styrene. Expansion rate was measured in a manner similar to that of Example 1, Table 1 shows the results.

COMPARATIVE EXAMPLE 6

For comparison, polymer particles were prepared in the following prescription and expansion rates were measured.

Polymer particles F were prepared in a manner similar to that of Example 1, except that the monomeric mixture comprised 10 parts tertiary butyl styrene and 90 parts styrene. Expansion rate was measured in a manner similar to Example 1. Table 1 shows the results.

COMPARATIVE EXAMPLE 7

For comparison, polymer particles were prepared in the following prescription and expansion rates were measured.

Polymer particles G were prepared in a manner similar to that of Example 1, except that the monomeric mixture comprised 100 parts styrene. Expansion rate was measured in a manner similar to Example 1. The results are shown in Table 1.

EXAMPLE 8

110 parts water, 0.15 par tricalcium phosphate, 0.006 part alpha olefine sodium sulfonate and 0.3 part sodium chloride were charged into an autoclave provided with an agitator. Next, 70 parts styrene were added with stirring and dispersed. The styrene contained 0.21 part benzoylperoxide, 0.1 part 1,1-(tert-butylperoxi)-3,3,5-trimethylcyclohexane and 0.7 part dioctyladipate. The mixture produced was immediately heated to 90° C. to initiate polymerization. At a conversion rate of 40% by weight, 30 parts of tertiary butyl styrene containing 0.09 part of benzoylperoxide, were added and the polymerization was further continued for 4 hours. Thereafter, 10 parts butane and 1.8 parts cyclohexane were added as foaming agent and then the autoclave was heated to 110° C. promptly. After the autoclave was maintained at 110° C. for 8 hours, it was cooled to 40° C. Polymer particles H were prepared after dehydration, drying and sieving. The polymer particles H produced thereby were subjected to measurement of expansion rate. The results are shown in Table 1.

Star-90" molding machine manufactured by Toyo Machinery and Metal Co., Ltd. A metallic mold with cavity, such as illustrated in FIGS. 1A and 1B, was used. Molding was carried out under the following conditions: Both faces, heating pressure was varied from 0.7 kg/cm² to 0.8 kg/cm², 1.0 kg/cm² 1.2 kg/cm², 1.4 kg/cm²; heating the metallic mold 7 sec, charging 10 sec, pre-blowing 7 sec, both faces heating 14 sec, auxiliary heating 7.5 sec, one face heating pressure 0.5 kg/cm², water cooling 60 sec, and air cooling 180 sec. The conditions were kept constant.

The resulting shaped articles were subjected to visual observation of surface state and to inner bonding.

Inner bonding indicates the bonding of particles on a broken surface of the shaped articles and is represented by the ratio of the number of particles torn off on the particles per se, not on the boundary faces of the particles, per total number of expanded particles on the broken surface. When the shaped article is broken, on the boundary faces of the expanded particles, bonding ratio is zero percent, whereas when breaking takes place on the particles per se, namely, within the particles, the bonding ratio is 100%.

The visual observation of surface state was made from the following views:
(a) Spaces between the expanded particles on the surface of the shaped articles being filled up or not.
(b) Degree of melting of polymer on the surface of the shaped article.

In the foregoing, the more the spaces were filled up, or the less the degree of melting on the surface of the shaped article, the better the property.

The results observed are set forth in Table 2.

As seen in Table 2, when the expandable polymer particles of the present invention were molded by heating under a steam pressure of 1.0 kg/cm²G or better, superior shaped articles were produced.

TABLE 1

| Examples & Comparative Examples | Polymer Particles | Expansion rate (cc/10 g) | | | | | | | | | | | |
|---|---|---|---|---|---|---|---|---|---|---|---|---|---|
| | | 0 kg/cm²G | | | 0.1 kg/cm²G | | | 0.2 kg/cm²G | | | 0.5 kg/cm²G | | |
| | | Time (min) | | | | | | | | | | | |
| | | 1 | 3 | 5 | 1 | 3 | 5 | 1 | 3 | 5 | 1 | 3 | 5 |
| 1 | A | — | 250 | 270 | — | 500 | 700 | — | 700 | 850 | 700 | — | — |
| 2 | B | — | 130 | 140 | — | 400 | 600 | — | 550 | 700 | 450 | 600 | — |
| 3 | C | — | 200 | 210 | — | 450 | 650 | — | 600 | 750 | 650 | 800 | — |
| 4 | D | — | 180 | 230 | — | 420 | 630 | — | 570 | 730 | 500 | 700 | — |
| 5 | E | — | — | 100 | — | 300 | 500 | — | 500 | 600 | 400 | 500 | 700 |
| Comp. 6 | F | — | 500 | 700 | — | 800 | — | 600 | — | — | 750 | — | — |
| 7 | G | — | 650 | 800 | 700 | 900 | — | 780 | — | — | 900 | — | — |
| 8 | H | — | 230 | 250 | — | 450 | 650 | — | 650 | 830 | 670 | — | — |

As is self-explanatory from Table 1, expandable polymer particles of the present invention provide pre-expanded particles having a good expansion rate under steam pressure of 0.1 kg/cm²G or more, while providing pre-expanded particles having low expansion rate under 0 kg/cm²G.

EXAMPLE 9

Polymer particles A through H obtained in the above Examples 1 through 5, Comparative Examples 6 and 7 and Example 8, were pre-expanded to give pre-expanded particles having 30 to 40 times the original apparent volume. After storage for 24 hours, the pre-expanded particles were molded by use of a "Pearl

EXAMPLE 10

Heat resistant property was tested for the shaped articles A through H exhibiting good inner bonding among the shaped articles obtained in Example 9. Heat resistance test was made using a uniform heating dryer produced by Tabai Co., Ltd., wherein the articles were heated for 168 hours at 80° C., 85° C., and 90° C., respectively. Changes (contraction) in the largest dimension (length) before and after heating were measured and ratio taken. The results are shown in Table 3.

TABLE 2

| Polymer particles | Pressure | | | | | | | | | |
|---|---|---|---|---|---|---|---|---|---|---|
| | 0.7 kg/cm² | | 0.8 kg/cm² | | 1.0 kg/cm² | | 1.2 kg/cm² | | 1.4 kg/cm² | |
| | Surface state | Inner Bonding (%) | Surface state | Inner Bonding (%) | Surface state | Inner Bonding (%) | Surface state | Inner Bonding (%) | Surface state | Inner Bonding (%) |
| Ex. A | X | O | Δ~X | 10 | O | 70 | O~⊙ | 90 | ⊙ | 100 |
| B | X | O | X | O | O~Δ | 50 | O | 80 | O~⊙ | 100 |
| C | X | O | X | O | O~Δ | 50 | O | 80 | O~⊙ | 100 |
| D | X | O | X | O | O~Δ | 50 | O | 80 | O~⊙ | 100 |
| E | X | O | X | O | Δ | 50 | O | 80 | O | 90 |
| Comp. Ex. F | Δ | 50 | O | 70 | ⊙ | 90 | ⊙ | 100 | Δ | 100 |
| G | O | 80 | ⊙ | 90 | ⊙ | 90 | ⊙ | 100 | Δ | 100 |
| Ex H | X | O | Δ~X | 10 | O | 60 | O~⊙ | 90 | ⊙ | 100 |

NOTE:
Marks used in surface state means:
X = very bad
Δ = Rather bad
O = Good
⊙ = very good
The same results were obtained in both of the cases for 30 times expansion and for 40 times expansion.

TABLE 3

| Item | Contraction ratio after 168 hours (%) | | | | | |
|---|---|---|---|---|---|---|
| Temperature (°C.) | 80 | | 85 | | 90 | |
| Polymer Particles | Expansion rate (times) | | | | | |
| | 30 | 40 | 30 | 40 | 30 | 40 |
| Ex. A | 0.5 | 0.7 | 0.7 | 1.0 | 1.7 | 2.0 |
| B | 0.1 | 0.2 | 0.5 | 0.7 | 1.2 | 1.5 |
| C | 0.1 | 0.2 | 0.5 | 0.7 | 1.2 | 1.5 |
| D | 0.1 | 0.2 | 0.5 | 0.7 | 1.2 | 1.5 |
| E | 0.1 | 0.1 | 0.3 | 0.4 | 0.8 | 1.0 |
| Comp. Ex. F | 3 | 4 | 5 | 7 | 10 | 12 |
| G | 5 | 6 | 6 | 7 | 13 | 15 |
| Ex. H | 0.2 | 0.3 | 0.4 | 0.5 | 1.0 | 1.5 |

From the results in Table 3, it is clear that the polymer particles A,B,C,D,E and H of the present invention exhibit much smaller contraction between 80° C. and 90° C. than F which has a composition outside the scope of the present invention, or G, which is a conventional polystyrene foamed article. The inventive articles show far superior heat resistance properties than the prior art articles.

EXAMPLE 11

Into an autoclave provided with an agitator, 110 parts water, 0.15 part tricalcium phosphate, 0.006 part alpha olefine sodium sulfonate and 0.3 part sodium chloride were charged. Then, a monomeric mixture comprising 30 parts tertiary butyl styrene and 70 parts styrene containing 0.16 part benzoylperoxide and 0.1 part 1,1-bis(-tert-butylperoxi)-3,3,5-trimethylcyclohexane, was added with stirring and dispersed. The autoclave was then immediately heated up to 90° C. and the polymerization was continued for 6 hours. Then, 8 parts butane and 1.5 parts heptane were added as foaming agent. Thereafter, the autoclave was elevated to 110° C.

The autoclave was cooled to 40° C. after being maintained at 110° C. for 8 hours and polymer particles K were prepared after dehydration, drying and sieving. The obtained polymer particles, having particle diameters between 710 and 1,000 microns, were subjected to extrusion foaming at an extrusion temperature of 125° C.

Test samples having the dimensions 300 mm×200 mm×20 mm, were cut from the foamed articles and subjected to heat resistance test in a similar manner to Example 9. The results obtained are shown in Table 4. The density of the samples was 0.10 g/cm³.

COMPARATIVE EXAMPLE 12

Polymer particles L were prepared in a manner similar to that of Example 11, except that the monomer was styrene alone.

The polymer particles L thus obtained were extruded at 110° C. to give samples which were tested for heat resistance property in a manner similar to Example 11. Table 4 shows the results. The density of samples was 0.10 g/cm³.

TABLE 4

| Test Polymer Particles | Contraction ratio after 168 hours (%) | | |
|---|---|---|---|
| | Temperature (°C.) | | |
| | 80 | 85 | 90 |
| K | 0.4 | 0.5 | 1.40 |
| L | 5 | 6 | 13 |

The results of Table 4 clearly show that the shaped articles produced by use of extrusion foaming of the instant invention are far superior in heat resistance property to those of the prior art.

The foregoing description is illustrative of the principles of the invention. Numerous extensions and modifications thereof would be apparent to the worker skilled in the art. All such modifications and extensions are to be considered to be within the spirit and scope of the invention.

What is claimed is:

1. An expanded shaped article obtained by pre-expanding expandable copolymer particles and subsequently heating the pre-expanded particles to form the expanded shaped article, wherein said expandable copolymer particles consist essentially of 3 to 15 weight percent volatile foaming agent, and a copolymer consisting essentially of 25 to 75 weight percent tertiary butyl styrene and 75 to 25 weight percent styrene alone or styrene in combination with other monomers copolymerizable therewith, wherein said copolymer is produced by suspension polymerization or emulsion polymerization, wherein one of said tertiary butyl styrene and said styrene alone or styrene in combination with said other monomers, is polymerized as an initial monomer, then, the other of said tertiary butyl styrene and said styrene alone or said styrene in combination with said other monomers, is added intermittently or at one time, when the conversion rate of the initial monomer is between 15 to 75%, and thereafter the polymerization being completed, and wherein the resulting article is substantially heat resistant in terms of dimensional stability.

2. The article of claim 1, wherein said other monomers is a monomer selected from the group consisting of acrylonitrile, alpha methyl styrene, methyl methacrylate, n-butyl acrylate, ethyl acrylate, and 2-ethylhexyl acrylate.

3. The article of claim 1, wherein said foaming agent is selected from the group consisting of n-butane, isobutane, n-pentane, iso-pentane, petroleum ether, dichlorodifluoromethane and mixtures thereof.

4. The article of claim 1, wherein said polymer particles are produced by suspension polymerization.

5. The article of claim 1, wherein said polymer particles are pellets of polymer produced by emulsion polymerization, then pelletized by an extrusion pelletizer, said pellets containing a foaming agent.

6. The article of claim 1, wherein said tertiary butyl styrene is polymerized as said initial monomer.

7. The article of claim 1, wherein said styrene alone or styrene in combination with other monomers are polymerized as said initial monomer.

8. The article of claim 1, wherein said polymer particles are pre-expanded by use of a steam or a mixture of steam and air as a heating medium at a pressure of 0.1 kg/cm$^2$G or more.

9. The article of claim 1, wherein the pre-expanded polymer particles are heated and molded in a closed mold which has openings therein for the escape of gas, by the use of steam as a heating medium at a pressure at the time of molding of the interior of the shaped articles, of 1.0 kg/cm$^2$G or more.

* * * * *